A. G. TUCKER.
Wheel Cultivator.
No 43,441. Patented July 5, 1864.
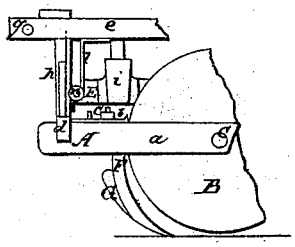
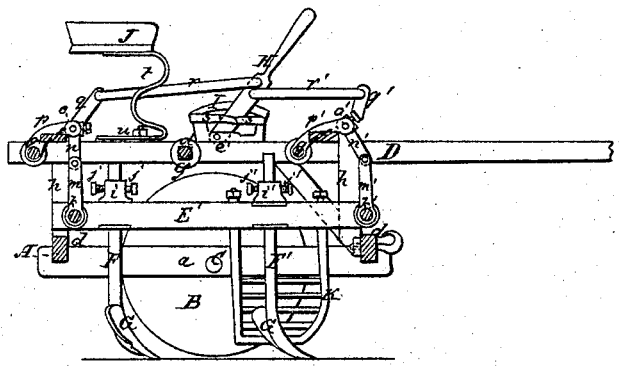
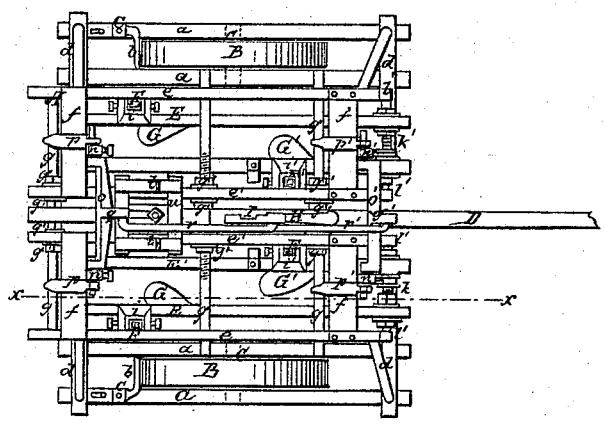
Witnesses:
H. O. Coombs
Henry Morris
Inventor:
A. G. Tucker
By Munn & Co.

UNITED STATES PATENT OFFICE.

ALFRED G. TUCKER, OF RICHVIEW, ILLINOIS.

IMPROVEMENT IN CULTIVATORS.

Specification forming part of Letters Patent No. 43,441, dated July 5, 1864.

*To all whom it may concern:*

Be it known that I, ALFRED G. TUCKER, of Richview, in the county of Washington and State of Illinois, have invented a new and Improved Cultivator; and I do hereby declare that the following is a full, clear, and exact description of the same, reference being had to the accompanying drawings, forming part of this specification, in which—

Figure 1 represents a longitudinal vertical section of my invention, the line $x\ x$, Fig. 2, indicating the plane of section. Fig. 2 is a plan or top view of the same, partly in section. Fig. 3 is a partial side elevation of the same.

Similar letters of reference indicate corresponding parts in the three views.

This invention relates to that class of cultivators which are intended to straddle a row of corn or other plants, and which are so constructed that the plows can be readily depressed in or raised from the ground by the action of a hand-lever from the driver's seat, and also adjusted to cut into the ground to any desired depth.

The nature of my invention, and its construction and principal advantages, will be readily understood from the following description.

A represents the frame of my cultivator, which may be constructed of wood or any other suitable material and supported by two wheels, B, the axles C of which have their bearings in the longitudinal timbers $a$. The wheels B run each between a pair of these timbers, and each wheel is provided with a scraper, $b$, which is intended to keep the face clean, and which is adjustable by means of a set-screw, $c$, so that it can be moved closer and closer to the wheel, as circumstances may require. The longitudinal timbers $a$ support the transverse timbers $d$, which are made in sections, leaving a space between their inner ends to admit the growing plants. The transverse timbers $d$ support the uprights $h$, the top ends of which are connected by the longitudinal bars $e\ e'$ and transverse bars $f$. The longitudinal bars $e\ e'$ are connected to each other by transverse rods $g$, which are secured to the inner bars, $e'$, by means of screw-threads and nuts $g'$ in such a manner that the two parts of the frame A can be adjusted closer together or farther apart, as may be desired. The rods $g$ support the guide-pole D, and by means of the uprights $h$ the timbers $e'$ and rods $g$ are elevated to such a height that the guide-pole readily passes over standing corn or growing plants of any other description.

E E' are the plow-beams, two in each section of the frame A. These beams are provided with sockets $i\ i$, one on the outside of each of the beams E, near their rear ends, and one on the inside of each of the beams E', near their front ends, which are provided with set-screws $j\ j'$ and intended to hold and adjust the standards F F', to which the plows G G' are firmly secured. The lower ends of the standards are curved, and they extend under the plowshares and flush with their edges, so that they form a sort of a landside, and the plows G G' are attached to these standards in such a manner that they throw the ground in opposite directions. The sockets $i\ i'$ and standards F F' of all the plows are made of a uniform size, so that the several plows can be interchanged and the direction in which the cultivator operates can be altered at pleasure. The beams E E' in each section of the cultivator are connected by screw-rods $k$, which are so arranged that said beams can be adjusted farther apart or closer together, as may be desired. The ends of these rods are guided in slotted brackets or in staples $l\ l'$, which are secured to the uprights $h$, and they (the rods) are suspended from links $m\ m'$, the upper ends of which are pivoted to arms or cranks $n\ n'$, which are secured to rock-shafts $o\ o'$. These rock-shafts have their bearings in curved arms $p\ p'$, which extend from the rods $g$ over the transverse bars $f\ f'$ of the two sections of the frame of the cultivator, and they are provided with arms $q\ q'$, which connect by rods $r\ r'$ with the hand-lever H. A notched arch, I, the bed-plate of which is slotted to receive the lower end of the hand-lever, serves to adjust the latter in the desired position, and springs $s$ prevent the same becoming disengaged spontaneously from the notch in which it is to be retained. By forcing the hand-lever out of this notch and moving it in the direction of the arrow marked near it in Fig. 1 of the drawings the plow-beams E E' are raised from the ground, and by throwing said hand-lever in the direction opposite to said arrow the beams are depressed, and by these means the depth to which the plows cut in the ground can be adjusted; or the plows can be readily raised from the ground whenever it is desired to clear an obstruction or to turn the machine or draw it from one field to another. By raising the standards G G' in the sockets $i\ i'$ the depth of the cut can be still further regulated.

The hand-lever H is situated in close proximity to the driver's seat J, so that the driver occupying said seat can easily reach and operate the same. The seat J is supported by curved or elastic uprights $t$, which rise from a bed-piece, $u$, that is adjustable backward or forward on the rear end of the draft-pole D. By these means the driver's seat can be accommodated to the weight of different drivers, and to the nature of the soil in which the cultivator is to be used.

The plows G', which are situated on the inner sides of the beams E' and near to their front ends, are protected by fenders K, which prevent the clods from falling on and crushing the growing plants.

This machine is of great advantage for cultivating corn, sorghum, or other similar plants; or it may be used for potatoes or other root plants usually planted in hills or drills. It can be readily adjusted to suit the width of the furrows or the distance of the hills, and the plows can be made to act in either direction and to any desired depth.

What I claim as new, and desire to secure by Letters Patent, is—

1. The beams E E', suspended by means of links $m\ m'$ and arms $n\ n'$ from rock-shafts $o\ o'$, in combination with the vertically-adjustable reversible plows G G' and hand-lever H, constructed and operating in the manner and for the purpose substantially as herein shown and described.

2. The sockets $i\ i'$ and set-screws $j\ j'$, in combination with the standards F F' and plows G G', constructed and operating in the manner and for the purpose substantially as set forth.

3. The screw-rods $g$ and nuts $g'$, in combination with the separate laterally-adjustable sections of the frame A, constructed and operating as and for the purpose specified.

4. The screw-rods $k\ k'$, with suitable nuts, in combination with the laterally-adjustable plow-beams E E', constructed and operating as and for the purpose specified.

ALFRED G. TUCKER.

Witnesses:
J. C. GUNN,
WM. MCFARLAND.